United States Patent
Qian et al.

(10) Patent No.: US 9,190,771 B2
(45) Date of Patent: Nov. 17, 2015

(54) ELECTRICAL CONNECTOR WITH A MAGNETIC ELEMENT WITH A RECEIVING SPACE

(71) Applicant: HON HAI PRECISION INDUSTRY CO., LTD., New Taipei (TW)

(72) Inventors: Qiu Qian, Kunshan (CN); Chun-Sheng Li, Kunshan (CN); Jian-Kuang Zhu, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/283,150

(22) Filed: May 20, 2014

(65) Prior Publication Data
US 2014/0342578 A1   Nov. 20, 2014

(30) Foreign Application Priority Data
May 20, 2013   (CN) .................... 2013 2 02750874 U

(51) Int. Cl.
*H01R 13/62* (2006.01)
*G06F 1/16* (2006.01)
*H01R 107/00* (2006.01)

(52) U.S. Cl.
CPC .............. *H01R 13/6205* (2013.01); *G06F 1/16* (2013.01); *H01R 2107/00* (2013.01); *H01R 2201/06* (2013.01)

(58) Field of Classification Search
CPC ..................... H01R 13/6205; H01R 13/7037
USPC ................................................ 439/38–40
See application file for complete search history.

(56) References Cited

U.S. PATENT DOCUMENTS

| | | | |
|---|---|---|---|
| 7,204,695 B1* | 4/2007 | Shiu et al. | 439/38 |
| 7,364,433 B2* | 4/2008 | Neidlein | 439/66 |
| 7,625,212 B2* | 12/2009 | Du | 439/39 |
| 8,448,304 B2* | 5/2013 | Tsao | 24/412 |
| 2008/0215283 A1* | 9/2008 | Sri-Jayantha et al. | 702/130 |
| 2012/0077386 A1 | 3/2012 | Shu et al. | |
| 2012/0178271 A1 | 7/2012 | Rohrbach et al. | |

* cited by examiner

*Primary Examiner* — Chandrika Prasad
(74) *Attorney, Agent, or Firm* — Wei Te Chung; Ming Chieh Chang

(57) ABSTRACT

An electrical connector defines a front-to-back direction comprises an dielectric housing a plurality of contacts and a magnetic element. The dielectric element comprises a base and a mating tongue extending forward from the base. The contacts are received in the dielectric housing and each comprises a contacting portion exposed to at least one surface of the mating tongue. The magnetic element is assembled on front of the base and defining a receiving space for the tongue. The tongue is at least partially received in the receiving space with an opening facing forward.

20 Claims, 6 Drawing Sheets

ELECTRICAL CONNECTOR WITH A MAGNETIC ELEMENT WITH A RECEIVING SPACE

FIELD OF THE INVENTION

The present invention generally relates to an electrical connector and assembly thereof.

DESCRIPTION OF RELATED ART

US Patent Publication 2012/0178271 discloses an electrical connector comprising a first electrical connector and a second electrical connector. The first electrical connector includes a magnet and first contacts while the second electrical connector includes a magnetic element and second contacts. The two electrical connectors are mated to each other in a mating direction. However, arrangement of magnets may be difficult and complex in a complicated electrical connector.

In view of the foregoing, an electrical connector assembly with a magnetic element is provided.

SUMMARY OF THE INVENTION

Accordingly, an object of the present invention is to provide an electrical connector assembly with a mating port with different transporting interfaces.

In order to achieve the object set forth, an electrical connector defines a front-to-back direction comprises an dielectric housing a plurality of contacts and a magnetic element. The dielectric element comprises a base and a mating tongue extending forward from the base. The contacts are received in the dielectric housing and each comprises a contacting portion exposed to at least one surface of the mating tongue. The magnetic element is assembled on front of the base and defining a receiving space for the tongue. The tongue is at least partially received in the receiving space with an opening facing forward.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Referring to FIG. 1 to FIG. 6, an electrical connector assembly 1000 comprises a first electrical connector 1 and a second connector 2 confronting to the first electrical connector. The electrical connector assembly defines an only mating direction (or a front-to-back direction) for an anti-displug structure.

Figure 1:
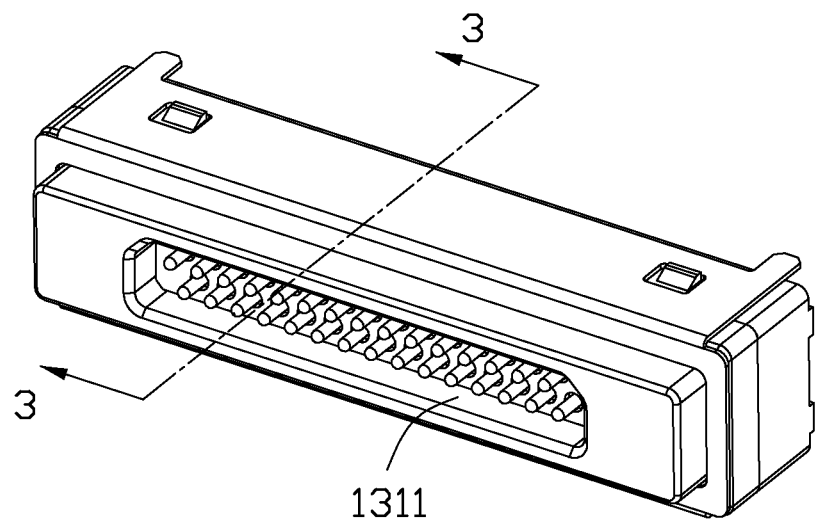
FIG. 1 is a perspective view of a first electrical connector of an electrical connector assembly in accordance with the present invention.
Figure 2:
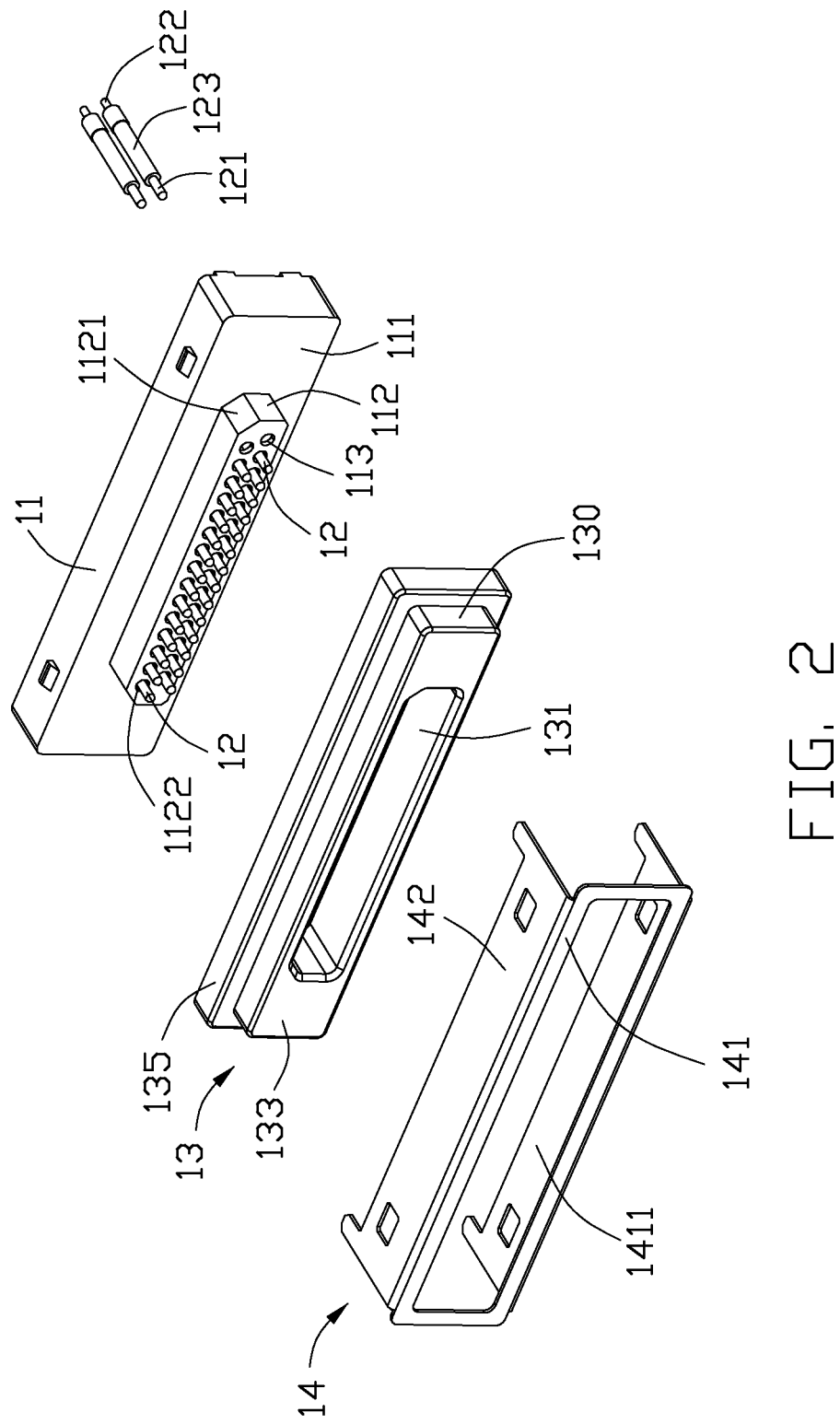
FIG. 2 is an exploded view of the first electrical connector shown in FIG. 1.
Figure 3:
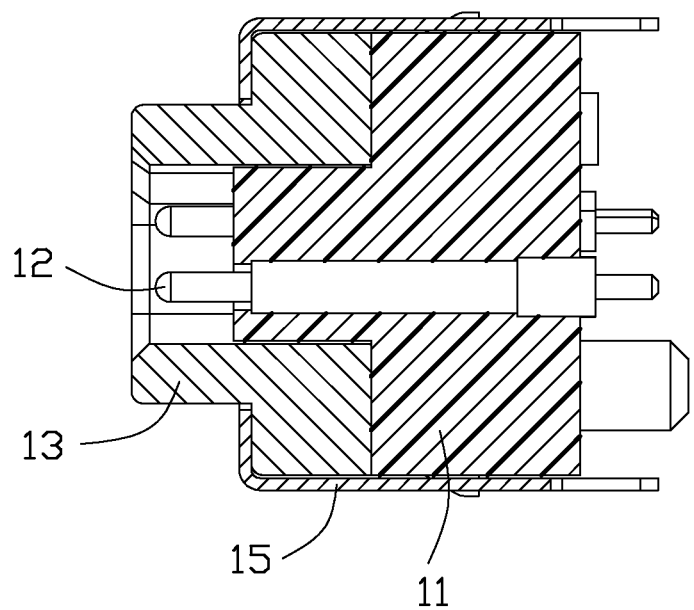
FIG. 3 is a cross-sectional view of the first electrical connector shown in FIG. 1 along a section A-A.

Referring to FIGS. 1-3, the first electrical connector comprises a first dielectric housing 11, a plurality of first contacts 12, a magnetic element 13 assembled to the first housing 11 and a first metal shell 14 shielding the first dielectric housing 11 and contacts 13.

The first dielectric housing 11 comprises a base 111 and a mating tongue 112 extending forward from the base 111. The mating tongue 112 is shaped as a rectangle with a cut 1121 in one of the four corners, preventing the first electrical connector from being misconnected. In other embodiments, the outline of the mating tongue is not a 180-degree-symmetrical relative to the center thereof. The first dielectric housing defines a plurality of passageways 113 passing through the base 111 and the mating tongue 112. The passageways are arranged in two rows to receive corresponding first contacts.

The first contacts 12 are pogo pins and divided into two rows corresponding to the passageways 113. The first contacts of different rows are alternate in a front-to-back view. Each first contact includes a pin-shaped contacting portion 121 in front of the mating tongue 112, a tail portion 122 exposed to the back of the base and a sleeve portion 123 connecting said two portions. The contacting portion 121 is moveable relative to the sleeve portion 123.

The magnetic element 13 defines a front face 133 and a receiving space 131 corresponding to the outline of the mating tongue 112. A mating space 1311 is defined by the mating tongue 112 and the magnetic element 13. It is to say that magnetic element encircles the first contacts 12, especially the contacting portion 121. The contacting portions 121 are received in both the mating space 1311 and the receiving space 131. The magnetic element 13 has a pressing part 135 pressing against to the front face 1122 of the base 111 and embracing the mating tongue 112, and a projecting part 130 protruding forwardly from the pressing part 135.

The first metal shell comprises a board portion 141 pressing against to the front face 1122 of said pressing part and a mounting portion 142 fixed to the base 111. The board portion defines a space 1141 for receiving the magnetic element. The first metal shell is locked to the first dielectric housing by several protrusions and notches so as to hold the magnetic element between the first metal shell 14 and the first dielectric housing.

Figure 4:
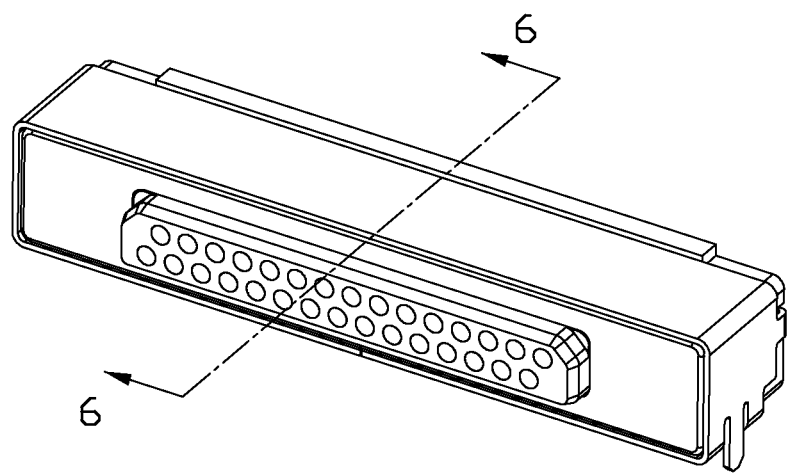
FIG. 4 is a perspective view of a second electrical connector of the electrical connector assembly.
Figure 5:
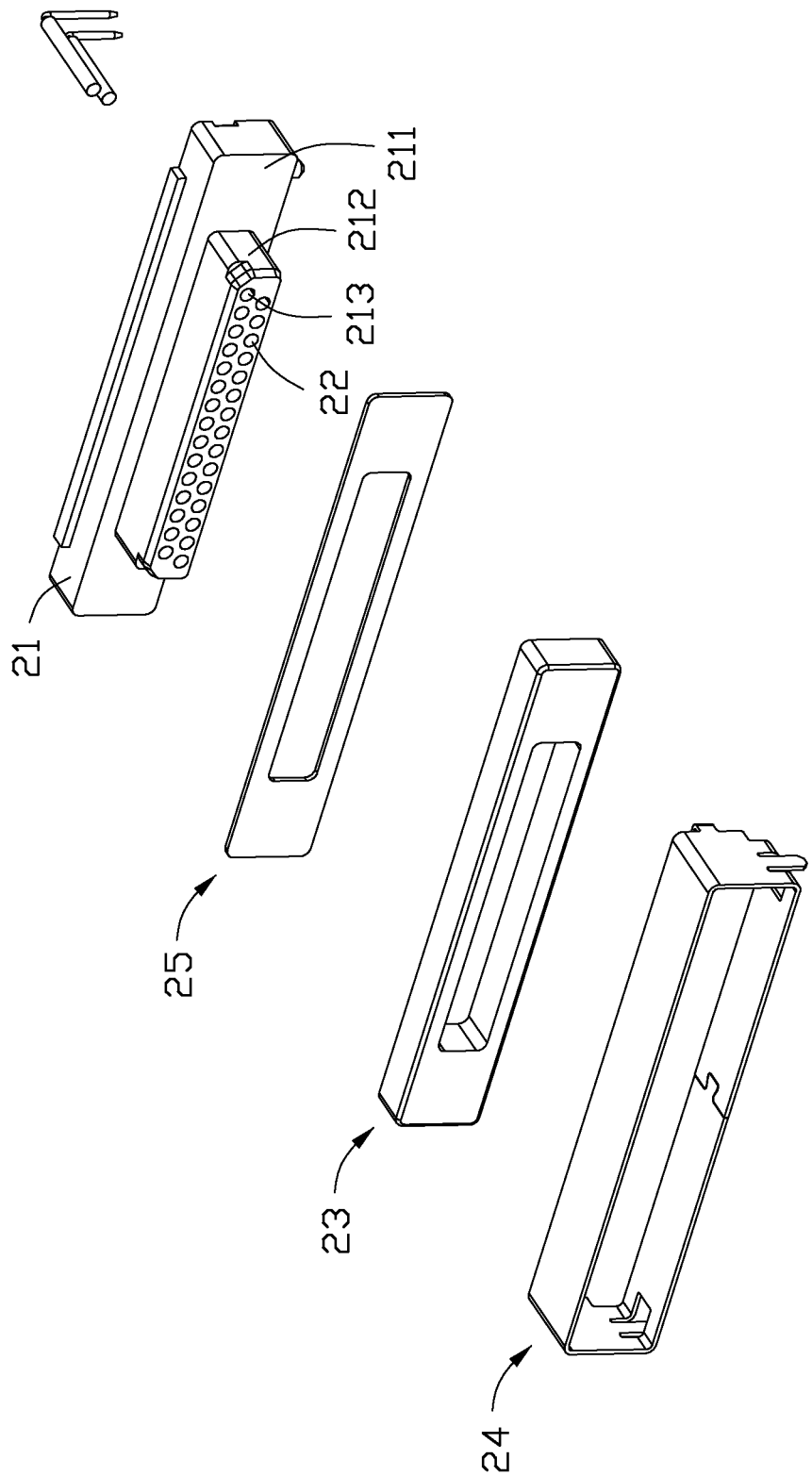
FIG. 5 is an exploded view of the second electrical connector assembly shown in FIG. 4.
Figure 6:
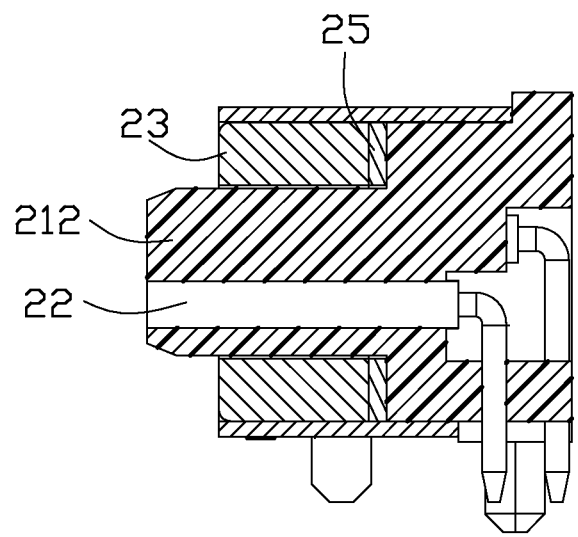
FIG. 6 is a cross-sectional view of the second electrical connector shown in FIG. 4 along a section B-B.

Combining FIGS. 4-6, the second electrical connector 2 comprises a second dielectric housing 21, a plurality of second contacts 22, a second magnetic element 23 and a second metal shell 24 shielding the second dielectric housing.

The second dielectric housing comprises a body portion 211 and a mating portion 212 fitting for the mating space 1311. The second magnetic element 23 is located in front of the body portion 211. The second metal shell 14 is aligned with the second magnetic element 23 in the front from a top-to-bottom view. A plurality of second passageways is formed on the second dielectric housing and passes through the body portion 211 and the mating portion 212. The second is to receive the second contacts and matches the first passageways one by one.

Referring to FIG. 5, each second contact is L-shaped and aligned with the front face of the mating portion 212. A metal sheet 25 is assembled between the second dielectric housing 21 and the second magnetic element 23 for attracting the second magnetic element 23 by magnetic force. The metal sheet 25 and the second magnetic element 23 are both hollow to allow the mating portion 212 to pass through. In other words, the second magnetic element also encircles the second contacts.

When the two electrical connector mate with each other, the two magnetic elements attract each other owing to magnetic force. Of course, only one magnetic element is necessary while the other one could be anther component made of ferromagnetic metal. Anyhow, both are deemed as magnetic attraction elements.

It is to be understood, however, that even though numerous characteristics and advantages of the present invention have been set forth in the foregoing description, together with details of the structure and function of the invention, the disclosure is illustrated only, and changes may be made in detail, especially in matters of shape, size, and arrangement of parts within the principles of the invention to the full extent indicated by the broad general meaning of the terms in which the appended claims are expressed.

We claim:

1. An electrical connector defining a front-to-back direction comprising:
   a dielectric housing comprising a base and a mating tongue extending forward from the base;
   a plurality of contacts received in the dielectric housing and each comprising a contacting portion exposed to at least one surface of the mating tongue;
   a magnetic element assembled on front of the base and defining a receiving space for the tongue extending therein;
   wherein the tongue is at least partially received in the receiving space.

2. The electrical connector as claimed in claim 1, wherein the contacting portions are exposed to a front surface of the mating tongue.

3. The electrical connector as claimed in claim 2, wherein front ends of the contacting portions are received in the receiving space.

4. The electrical connector as claimed in claim 1, wherein the opening is not 180-degree symmetrical relative to the centre thereof.

5. The electrical connector as claimed in claim 4, wherein the mating tongue is shaped as a rectangle with a cut in one corner while viewed from a front-to-back view.

6. The electrical connector as claimed in claim 3, wherein the contacts are arranged in two rows, contacts of different rows are alternate one by one in a side direction perpendicular to said front-to-back direction.

7. The electrical connector as claimed in claim 1, wherein said magnetic element defines a pressing part against to a front face of the base and embracing said mating tongue.

8. The electrical connector as claimed in claim 7, wherein the electrical connector further comprises a metal shell with a mounting portion fixed to the base and a board portion pressing against to said pressing part.

9. The electrical connector as claimed in claim 8, wherein said magnetic element further defines a projecting part protruding from said pressing part and formed with the receiving space at front of said one surface of the mating tongue for receiving said contacting portions, said projecting part protruding outwardly from said board portion.

10. An electrical connector assembly comprising:
    a first electrical connector defining a first mating face, and comprising a first housing with a plurality of first contacts retained therein and a magnetic element encircling the contacts, the magnetic element being adjacent to the first mating face;
    a second electrical connector defining a second mating face, and comprising a second dielectric housing with a plurality of second contacts retained therein and a ferromagnetic element, the ferromagnetic element being made of metal and adjacent to the second mating face;
    wherein the first electrical connectors is mated to the second electrical connector in a mating direction with the magnetic element and the ferromagnetic attracting each other by a magnetic force.

11. The electrical connector assembly as claimed in claim 10, wherein the ferromagnetic element encircles the second contacts.

12. An electrical connector assembly comprising:
    a first electrical connector including:
    a first insulative housing defining a first front face with therein a plurality of first passageways extending through said first front face along a front-to-back direction;
    a first magnetic attraction element positioned upon the first housing and extending beyond the first front face with a distance so as to cooperate with the first housing to define a receiving cavity within the first magnetic attraction element while in front of the first front face;
    a plurality of first contacts disposed in the corresponding first passageways respectively with front contacting sections extending beyond the first front face and into the receiving cavity;
    a second electrical connector matable with the first electrical connector, including:
    a second insulative housing defining a second front face with therein a plurality of second passageways extending through said second front face along said front-to-back direction;
    a second magnetic attraction element positioned upon the second housing and recessed behind the second front face so as to have a front portion of the second housing extend forwardly beyond the second magnetic attraction element to be received within the receiving cavity;
    a plurality of second contacts disposed in the corresponding second passageways respectively behind the second front face; wherein
    at least one of said first magnetic attraction element and said second magnetic attraction element is a magnet; wherein
    the first contacts are retractable in the front-to-back direction to have thereof front tip portions retracted back into the corresponding first passageways when the first electrical connector and the second electrical connector are mated with each other with the first front face confronting the second front face in the front-to-back direction and with the first magnetic attraction element confronting the second magnetic attraction element in the front-to-back direction and facing the front portion of the second housing in a transverse direction perpendicular to said front-to-back direction.

13. The electrical connector assembly as claimed in claim 12, wherein the first magnetic attraction element circumferentially surrounds the first housing.

14. The electrical connector assembly as claimed in claim 12, wherein said second magnetic attraction element circumferentially surrounds the second housing.

15. The electrical connector assembly as claimed in claim 12, wherein a front end of each of the second contacts is flush with the second front face of the second housing.

16. The electrical connector assembly as claimed in claim 12, wherein the front portion of the second housing and the first magnetic attraction element are equipped with alignment means for assuring only one relative orientation during mating between the first electrical connector and the second electrical connector.

17. The electrical connector assembly as claimed in claim 16, wherein said alignment means is formed on an exterior face of the second housing and on an interior face of the first magnetic attraction element.

18. The electrical connector assembly as claimed in claim 12, wherein the first electrical connector further includes a first metallic shield, and the first magnetic attraction element is sandwiched between the first shield and the first housing.

19. The electrical connector assembly as claimed in claim 18, wherein said first attraction element is sandwiched between the first shell and the first housing not only in the front-to-back direction but also in a vertical direction perpendicular to said front-to-back direction.

20. The electrical connector as claimed in claim 12, wherein the second electrical connector further includes a second metallic shield, and the second magnetic attraction element is sandwiched between the second shield and the second housing.

\* \* \* \* \*